April 6, 1954    E. C. SEARLS    2,674,328
POWER PROPELLED HAND TRUCK AND CONTROL UNIT THEREFOR
Filed Dec. 28, 1949    2 Sheets-Sheet 1
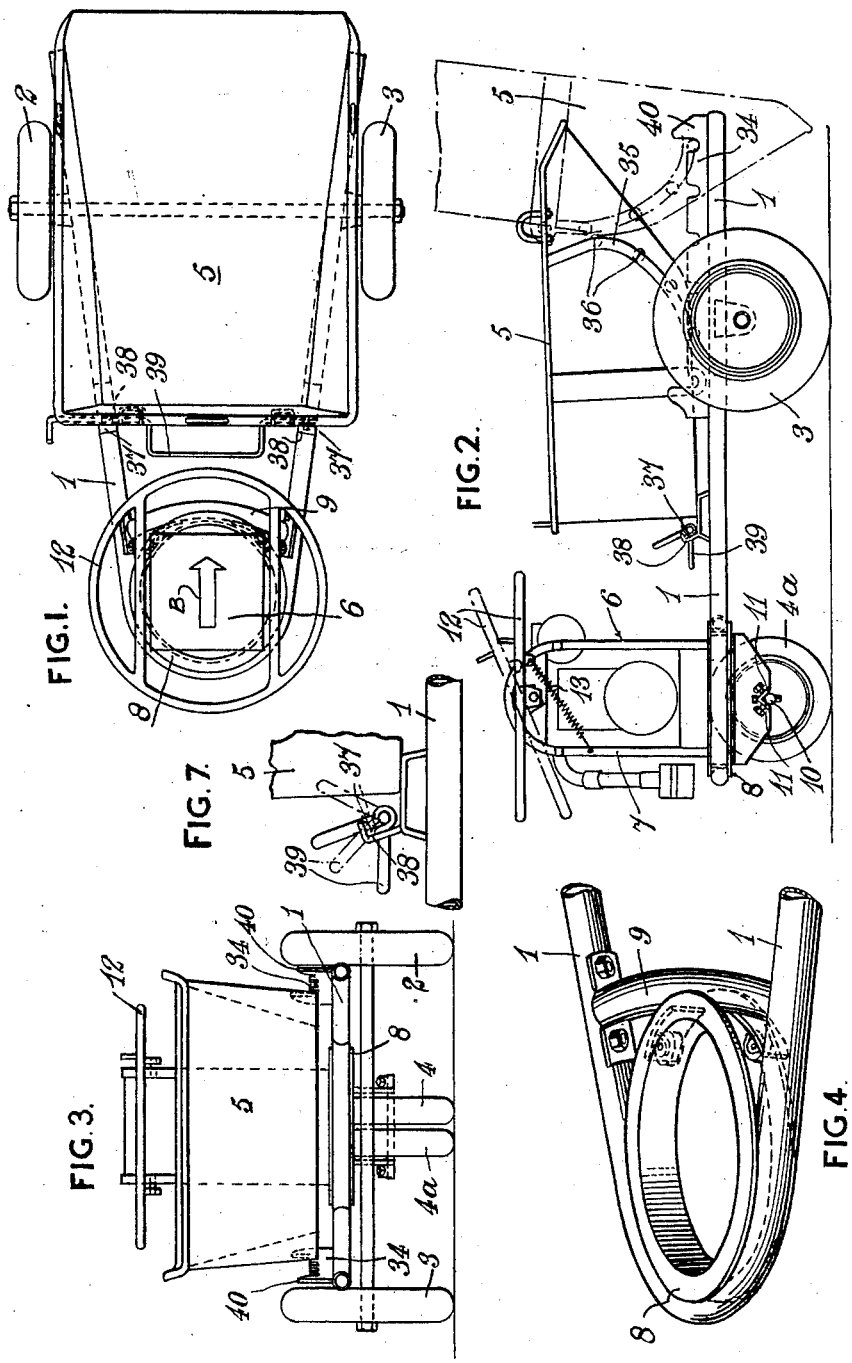
INVENTOR
Edward Charles Searls
BY Richard [?]
AGENT April 6, 1954          E. C. SEARLS          2,674,328

POWER PROPELLED HAND TRUCK AND CONTROL UNIT THEREFOR

Filed Dec. 28, 1949          2 Sheets-Sheet 2

INVENTOR
Edward Charles Searls
BY Richard Graf
AGENT

Patented Apr. 6, 1954

2,674,328

UNITED STATES PATENT OFFICE 2,674,328

POWER PROPELLED HAND TRUCK AND CONTROL UNIT THEREFOR

Edward Charles Searls, Blackheath, England, assignor to Winget Limited, Rochester, England Application December 28, 1949, Serial No. 135,415

3 Claims. (Cl. 180—26)

This invention relates to a truck, more particularly to an improved power propelled hand truck or carrier for operation by an internal combustion engine. For simplicity, such a power propelled hand truck or carrier will hereinafter be referred to as a truck. The invention is especially concerned with a tipping truck to be driven by an internal combustion engine and which is supported in each of three places by one or more road wheels, the wheels being arranged in the form of a triangle with the apex wheel or wheels adjacent to the engine and adapted for driving and steering.

The primary object of my invention is to generally improve trucks of the type mentioned.

One object of my invention is to provide a construction enabling the engine to rotate on the truck frame, thus making steering of the truck easier.

Another object of my invention is to provide a mechanism whereby both steering and control of the truck is effected by the steering means.

A more specific object of the invention is to provide a truck of the barrow type, that is, the kind of truck that a workman can conveniently handle by walking along adjacent to the truck, and by steering the truck with the aid of the provided means. At the same time, my invention aims at a smaller as well as larger version of this kind of truck, for example, a small powered wheelbarrow for use in parks and gardens and a larger powered truck for use in docks, markets or in the Services.

Still another object of my present invention is to provide an arrangement whereby it is a relatively simple matter to remove and insert the engine bloc when required.

Further objects center about a construction to incorporate a tipping truck, a flat carrier, a concrete mixer, a large broom with associated receptable to receive garbage, or any other suitable contrivance.

To the accomplishment of the foregoing and other objects which will hereinafter appear, my invention consists in the elements of the truck and their relation one to the other, as hereinafter are more particularly described in the specification and sought to be defined in the claims. The specification is accompanied by drawings in which:

Figure 1 is a plan view of one embodiment of the invention;

Figure 2 is a side view;

Figure 3 is a rear end elevation;

Figure 4 is a detail of the apex portion of the frame with the collar in position, the framework mounting the engine being omitted;

Figure 6 (to an enlarged scale) is a detail view of the throttle control mechanism as operated by the steering wheel and Figure 7 is a detail view showing the locking means for the tipper.

Figure 5:
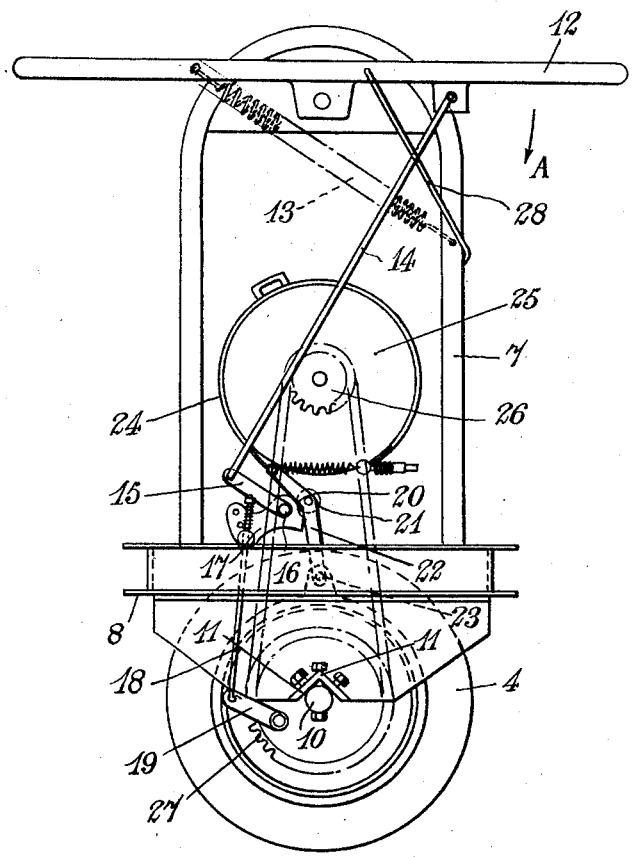
Figure 5 (to an enlarged scale) is a detail view showing the brake control mechanism as operated by the steering wheel.
Figure 6:
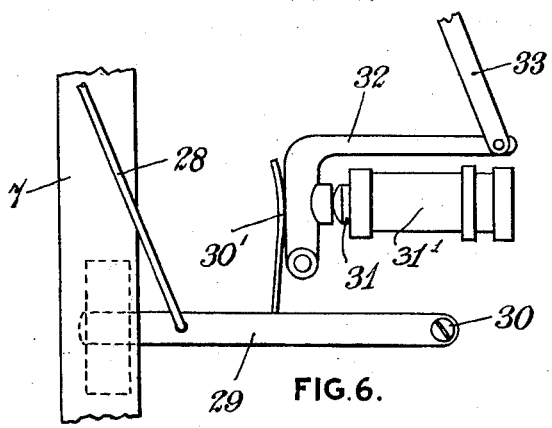

Referring to the drawings it will be noted that the truck comprises an A-shaped frame 1 arranged horizontally and carried by single road wheels 2, 3 at the side and two road wheels 4, 4a at the apex. A tipper 5 is mounted on the arms of the frame 1 and a power unit 6 is disposed above the front wheels 4, 4a. The engine 6, preferably a 2 H. P. motor is mounted in a framework 7 carried by an annular collar 8 shaped to be disposed within the rounded apex of the A-shaped frame 1 which forms a bearing surface for the collar as indicated in Figure 4. The bearing surface for the collar 8 is completed by a cross member 9 of substantially arcuate shape, extending between the arms of the frame 1. In this manner the engine 6 is rotatably mounted on the frame 1 due to the fact that the annual collar 8 may be turned relatively to the bearing surface in one direction or the other in order to facilitate steering of the truck. If desired roller bearings may be provided for the collar 8 to ease friction and to ensure easy movement, see Figure 4.

The wheels 4, 4a at the apex are mounted under the engine adjacent to the apex of the A-shaped frame 1 on an axle 10 carried by two brackets 11, 11 depending from the annular collar.

Steering and control of the truck is effected by a steering wheel 12 disposed at or near to the top of the engine which is disposed in the framework 7 which also carries the steering wheel 12. A spring 13 is provided and normally urges or rocks the wheel 12 downwardly about a diameter towards the tipper or rear end of the truck. In this connection I should mention that in referring to the rocking of the steering wheel 12 I am assuming that the engine and its framework is in the position it would normally occupy, the front wheels being parallel with the rear wheels and the arrow B pointing towards the tipper. With the steering wheel rocked downwardly towards the tipper as shown in Figure 2 in full lines the brake is on and the transmission drive control is in disengaged position.

Pressure on the near side of the wheel 12 in Figure 2 is operable through link mechanism to release the brake, to engage the transmission drive control and to accelerate the motor as will be hereinafter more fully explained.

Referring now, more particularly, to Figure 5, it will be observed that a rod 14 is connected to the underside of the steering wheel 12. This rod is pivotally connected to a lever 15 on a shaft 16, which also carries another lever 17, the arrangement being such that on the lever 15 being rocked, a corresponding motion is transmitted to the lever 17. Pivotally connected to the lever 17 is a rod 18 which is pivotally attached to a brake actuating lever 19. When the steering wheel 12 is rocked in the direction of the arrow A, a thrust is transmitted through the rod 14 which rocks the levers 15 and 17 which motion is transmitted through the rod 18 to the brake actuating lever 19 to release the brake in the well known manner. Formed at the end of the lever 17 is a cam 20 and bearing against this cam is a follower 21 carried by a lever 22 pivoted as at 23 to the flange of one of the brackets supporting the front wheels. At the moment when the brake is fully released, the cam 20 engages the follower 21 and rocks the lever 22 slightly to the right hand side of Figure 5. This has the effect of tightening a brake band 24 about the casing of an epicyclic gear indicated generally at 25, thus effecting a drive through a sprocket wheel 26 to a driven sprocket 27, hereinafter more fully explained. Since the brake band can be slackened or tightened by the rocking of the steering wheel in the manner described, the arrangement constitutes a power transmission drive control, the arrangement also providing for the co-ordination of the wheel brake control with that of the transmission drive.

Also depending from the wheel 12 is a wire connector 28 secured to a horizontal link 29 which is pivoted to the framework 7 at 30. The link 29 is provided with an upward projection 30' which normally holds the engine in throttled down position. Rocking of the wheel 12 against the spring 13 depresses the wire connector 28 which turns the horizontal link 29 counter-clockwise which removes the projection 30' from its controlling position whereupon a spring pressed plunger 31, housed with its spring in a cylinder 31', moves outwardly under the action of its spring (not shown) to progressively open the throttle of the engine by means of a bell crank lever 32 and link 33, at the same time allowing the speed governor of the engine to operate unopposed (lever 33 is engine controlled). As soon as the pressure on the wheel 12 is released the spring 13 rocks the wheel back into normal position which throttles down the engine due to the projection 30' pressing back the plunger 31, applies brake by clockwise movement of the brake operating lever 19 and releases the brake band 24 from the rotatable plate in the gearing the disengagement of the brake band being effected by the clockwise movement of the shaft 16.

In the embodiment of the invention illustrated in the drawings the carrier is provided with a tipper 5 to carry the load and to tip it where required. In Figure 2 the tipper is shown in horizontal position in full lines and in the fully tipped position in dash lines. The arms of the A-shaped frame are each provided with a rack 34 and the tipper is provided at each side with a curved tipping support 35 having lateral pins 36 to engage within the recesses in the rack as the tipper is swung into the position shown in dash lines. Co-operating clip members 37, 38 are provided respectively on the tipper and at opposite ends of a cross rod 39 bent to form a handle. The clips 37 and 38 when in engagement, retain the tipper normally in the horizontal position. At the end of each rack an upstanding projection 40 is provided to act as a stop to prevent the tipper coming off the frame altogether when in the fully tipped position.

It is believed that the construction and operation of my truck will be understood from the foregoing detailed description thereof. A more general explanation of the truck construction is given in the following part, and some of the advantages of my invention are also reviewed hereinafter.

The frame of my trucks may be simply constructed of metal, for example, angle or channel iron or more advantageously tubular metal, shaped to form a letter A arranged horizontally with the point or apex of the A rounded off for the purpose already explained. With a frame shaped in this manner the engine may be so disposed that the thrust is exerted in a substantially horizontal direction along a line drawn through the center of the load carrying axles which are secured to the arms of the letter A. In this way backlash and instability are reduced to a minimum.

The point or apex of the A-shaped frame is rounded off and a cross-member having a cut away part of arcuate shape is secured by bolting or by other suitable means between the two arms of the frame adjacent to the apex, the arrangement being such that the rounded end of the A and the arcuate cross-member form a circular seating to act as the bearing surface above referred to. The inner surface of this circular seating is embraced by an annular collar adapted to turn on a vertical axis relatively to the bearing surface, and a rectangular or other suitable framework is secured in position upon the collar. This framework forms the support upon which the engine of the truck may be mounted. The engine may be of any suitable size, depending upon the work the particular truck is designed to carry out. For an average all purpose truck for use in industry, for example, in the building trade to carry bricks, rubble and the like, I have found that a 2 H. P. engine adapted to run at about 2000 R. P. M. gives very satisfactory results when provided with transmission gearing giving a reduction to about 50 R. P. M. on the driven wheel which in an average sized truck would approximate to walking pace.

It will be appreciated that the engine mounted on the framework carried by the annular collar may be turned or rotated relatively to the bearing surface in one direction or the other, this arrangement being adopted to facilitate steering of the truck. To this end the apex wheel is mounted under the engine adjacent to the apex of the A-shaped frame and is adapted to be turned when the collar is rotated relatively to the bearing surface. In this way steering of the truck is effected by control of the apex wheel which is also the driving wheel of the truck, the drive being transmitted from the engine to the apex wheel through the medium of suitable reduction gearing.

To remove the engine it is only necessary to take off the crossbar of the A-shaped frame, for example, by loosening off the securing bolts, after which the engine, framework and collar may be removed en bloc, that is, as one, by sliding towards the base of the A-shaped frame and away from the apex thereof.

The steering wheel is disposed adjacent to the top of the engine and is spring-loaded to return to normal or neutral position, the application of pressure on one side of the steering wheel, that is to say, rocking the wheel about a diameter, being arranged to engage clutch mechanism to release the brake and to accelerate the motor, and turning of the wheel being arranged to effect steering.

A preferred method of operating the brake from the steering wheel is to arrange for the brake to be incorporated with a sprocket wheel on the driven wheel at the apex, such sprocket wheel forming a connecting means to which the engine may be coupled.

As described, suitable reduction gearing is provided to transfer the drive from the engine to the apex wheel of the truck. This reduction gearing may be in the form of a conventional set of gears wheels selected to give the desired reduction or a gear wheel and chain coupling arrangement may be used but I prefer to employ a suitable form of epicyclic gearing.

Control of the epicyclic gearing when employed, that is to say, the engagement and disengagement, is effected by cam means operated by control mechanism from the steering wheel as above described, for example, downward pressure on the near side to rock the steering wheel about a diameter on its central support may operate a mechanism to cause the rotary motion of a driving shaft to be transmitted through the gearing to a driven shaft. In greater detail, rocking of the steering wheel about a diameter may be operable to close a brake band around a rotatable plate in the gearing which is thereby held against rotation and the drive is transmitted to the driven shaft. Release of the pressure on the rotatable plate allows it to turn and the drive is not transmitted. When conventional gearing is employed a conventional clutch may be incorporated, operation being effected from the steering wheel.

With a tipping truck, suitable clips may be provided to connect the truck body to the A-shaped frame which is provided with a second cross bar adjacent to the base of the A-shaped frame for strengthening purposes. The frame may be provided with upwardly projecting supports at each side to provide trunnion bearings for the tipper. When a flat carrier or other contrivance is provided instead of the tipper it may be mounted on the frame in any suitable and convenient manner and various different contrivances may be interchangeable on a single carrier.

It should be noted that the term "wheel" whenever used in the claims is meant to cover a single wheel and more than one wheel as well.

It will be apparent that while I have shown and described my invention in a preferred form, many changes and modifications may be made without departing from the spirit of the invention defined in the following claims.

What I claim is:

1. A truck comprising the combination of a horizontally disposed A-shaped frame formed with a substantially semicircular apex, at least a single road wheel disposed below the apex, laterally spaced road wheels towards the rear of the frame, a collar rotatably mounted in said apex and carrying the apex road wheel, a framework supported by the collar, an internal combustion engine unit for driving the truck through the apex road wheel, the engine and the apex road wheel being movable as one with the collar, a steering wheel pivotally mounted at its diameter at the top of the framework, a spring for normally maintaining the steering wheel in a substantially horizontal plane, a power transmission drive, a brake mechanism, a spring-loaded throttle mechanism, the power transmission drive and the brake and throttle mechanisms being controllable by the steering wheel, a rod connected to the steering wheel for actuating a lever having a cam, a cam follower mounted on a lever for actuation by the cam, the engine and apex road wheel being connected by gearing constituting the power transmission drive, the lever carrying the cam follower controlling the engagement and disengagement of the gearing, a brake-actuating lever, a rod between said cam lever and the brake-actuating lever to apply or to release the brake, and a connector between the steering wheel and the spring-loaded throttle mechanism to actuate the latter mechanism, the arrangement being such that when the steering wheel is substantially horizontal, the power transmission drive is disengaged, the brake is applied, and the engine is throttled down, the rocking of the steering wheel against the action of the steering wheel spring causing the power transmission to be engaged and the brake to be released, and progressively allowing the throttle to open by the action of its spring in accordance with the extent of the rocking of the steering wheel so that the speed of the truck is proportional to the said rocking.

2. In the truck according to claim 1, said power transmission drive including a brake band, an epicyclic gearing, a casing enclosing the epicyclic gearing, and an outer plate rotatably arranged about the casing, the lever which carries the cam follower being adapted to tighten the brake band about the outer plate and to effect the drive.

3. In the truck according to claim 1, said spring-loaded throttle mechanism including a spring-pressed plunger, a bell crank lever normally engaging the plunger, and a link connected to said connector and normally engaging the bell crank lever, thereby acting upon the plunger against the force of the spring and holding the engine in throttled down position, the plunger, upon the disengagement of the link from the bell crank lever, being moved by the spring to actuate the bell crank lever and to open the throttle of the engine.

References Cited in the file of this patent

UNITED STATES PATENTS

| Number | Name | Date |
| --- | --- | --- |
| 941,129 | Charter | Nov. 23, 1909 |
| 1,210,762 | Church | Jan. 2, 1917 |
| 1,262,049 | Hollis | Apr. 9, 1918 |
| 1,928,915 | Stout | Oct. 3, 1933 |
| 2,420,111 | Thostenson | May 6, 1947 |
| 2,477,065 | Kuert et al. | July 26, 1949 |

FOREIGN PATENTS

| Number | Country | Date |
| --- | --- | --- |
| 529,814 | Great Britain | Nov. 28, 1940 |
| 884,631 | France | Aug. 23, 1943 |